US011686646B2

(12) United States Patent
Guo et al.

(10) Patent No.: US 11,686,646 B2
(45) Date of Patent: Jun. 27, 2023

(54) PRESSURE-ADJUSTABLE AUXILIARY CONTROL SYSTEM FOR HIGH-PRESSURE GAS SEALING DETECTION

(71) Applicant: Tsinghua University, Beijing (CN)

(72) Inventors: Fei Guo, Beijing (CN); Yijie Huang, Beijing (CN); Chong Xiang, Beijing (CN); Zhaoxiang Zhang, Beijing (CN); Ganlin Cheng, Beijing (CN); Lei Tan, Beijing (CN); Xiaohong Jia, Beijing (CN); Yuming Wang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/513,040

(22) Filed: Oct. 28, 2021

(65) Prior Publication Data

US 2022/0136925 A1 May 5, 2022

(30) Foreign Application Priority Data

Oct. 29, 2020 (CN) .......................... 202011183527.4

(51) Int. Cl.
*G01N 3/12* (2006.01)
*G01M 3/28* (2006.01)

(52) U.S. Cl.
CPC ........ *G01M 3/2807* (2013.01); *G01M 3/2869* (2013.01); *G01M 3/2876* (2013.01); *G01N 3/12* (2013.01); *G01N 2203/0019* (2013.01)

(58) Field of Classification Search
None
See application file for complete search history.

(56) References Cited

U.S. PATENT DOCUMENTS

| 2016/0116364 A1* | 4/2016 | Vaccaro | ................ G01M 3/229 73/40.7 |
| 2021/0231520 A1* | 7/2021 | Zhang | ..................... G01M 3/06 |
| 2022/0260449 A1* | 8/2022 | Thenard | ................ G01M 3/229 |

FOREIGN PATENT DOCUMENTS

| CN | 203909638 U | 10/2014 |
| CN | 208886392 U | 5/2019 |

(Continued)

OTHER PUBLICATIONS

Office Action dated May 19, 2021 in corresponding Chinese Application No. 202011183527.4; 8 pgs.

*Primary Examiner* — Alexander A Mercado
(74) *Attorney, Agent, or Firm* — Maier & Maier, PLLC

(57) ABSTRACT

A pressure-adjustable auxiliary control system for high-pressure gas sealing detection includes: a high-pressure chamber environment monitoring unit configured to construct high-pressure test gas sealing environment and to test sealing performance of a sealing member; a first gas pipeline divided into two branches, of which one branch is connected to the high-pressure chamber environment monitoring unit as a first gas replacement path; a second gas pipeline which is connected to a test gas pressurization path together with the other branch of the first gas pipeline, where a first booster pump processing unit and a second booster pump processing unit are sequentially arranged in the test gas pressurization path for pressurizing the test gas, and are connected to the high-pressure chamber environment monitoring unit; a system air control module configured for control of respective air control valves; and a booster pump air control module and a driving air source preprocessing unit.

14 Claims, 6 Drawing Sheets

(56) References Cited

FOREIGN PATENT DOCUMENTS

| CN | 110702528 A | 1/2020 |
| CN | 211374355 U | 8/2020 |

\* cited by examiner

PRESSURE-ADJUSTABLE AUXILIARY CONTROL SYSTEM FOR HIGH-PRESSURE GAS SEALING DETECTION

CROSS-REFERENCE TO RELATED APPLICATIONS

This application claims priority to Chinese Patent Application No. 202011183527.4, which was filed with China National Intellectual Property Administration on Oct. 29, 2020 and entitled "Pressure-Adjustable Auxiliary Control System for High-Pressure Gas Sealing Detection". The disclosure of the above patent application is incorporated herein by reference in its entirety.

TECHNICAL FIELD

The present disclosure belongs to the technical field of high-pressure gas sealing and, in particular, relates to a pressure-adjustable auxiliary control system for high-pressure gas sealing detection.

BACKGROUND

Confronted with a severe and urgent problem of shortage of energy resources and environmental degradation due to over-reliance on fossil fuels, countries all over the world are actively promoting the development of clean, environment-friendly and efficient energy. Hydrogen energy has become extremely promising secondary energy due to advantages such as diverse sources, high energy conversion efficiency, pollution-free, zero emission, storability, renewability or others. It is expected that hydrogen energy would be used as a next-generation energy carrier to solve critical issues of energy supply, safety and cleanness. In view of this, countries all over the world are accelerating the planning and development of hydrogen energy, and are committed to the research on critical technologies in the field of hydrogen energy and to the development of commercial applications of hydrogen energy products.

For a hydrogen energy product, hydrogen replenishment is achieved through a hydrogen refueling station. The hydrogen refueling station mainly uses a pressure difference between a hydrogen storage tank and the hydrogen energy product for hydrogen filling. Therefore, the pressure of the hydrogen storage tank of the hydrogen refueling station should be higher than the pressure of the hydrogen storage system of the hydrogen energy product. At present, however, some hydrogen energy products, such as hydrogen fuel cell vehicles, have a hydrogen storage pressure of up to 70 MPa. In order to further increase hydrogen energy density per unit volume for the hydrogen storage system and raise mileage per trip for the hydrogen fuel cell vehicles, techniques to increase the hydrogen storage pressure of the hydrogen storage tank of the hydrogen refueling station and develop hydrogen storage at a higher pressure will become a major trend in future development. Sealing components are indispensable parts of the hydrogen storage tank of the hydrogen refueling station. However, the sealing components are often most vulnerable due to factors such as a high pressure in the hydrogen storage medium and fluctuations in the ambient temperature. Once there is a failure in the sealing components, immeasurable serious consequences, such as fire hazards or even explosions, may be incurred. Therefore, it is necessary to conduct a research on high-pressure hydrogen sealing components.

SUMMARY

According to one aspect of the present disclosure, provided is a pressure-adjustable auxiliary control system for high-pressure gas sealing detection, including:

a high-pressure chamber environment monitoring unit, configured to construct high-pressure test gas sealing environment and to test sealing performance of a sealing member;

a first gas pipeline, divided into a first branch of first gas and a second branch of the first gas, where the first branch of the first gas is connected to the high-pressure chamber environment monitoring unit as a first gas replacement path; a first air control valve is arranged in the first branch of the first gas, and a second air control valve is arranged in the second branch of the first gas;

a second gas pipeline, in which a third air control valve is arranged;

a test gas pressurization path, connected to the high-pressure chamber environment monitoring unit, where the second branch of the first gas together with the second gas pipeline is connected to the test gas pressurization path;

a first booster pump processing unit and a second booster pump processing unit, arranged in the test gas pressurization path for pressurizing the test gas, where the first booster pump processing unit is located upstream of the second booster pump processing unit, and a first offload port is connected through offload paths located on the test gas pressurization path at a position upstream of the first booster pump processing unit and at a position downstream of the second booster pump processing unit respectively;

a system air control module, configured for control of respective air control valves in the auxiliary control system;

a booster pump air control module, connected to the system air control module, the first booster pump processing unit and the second booster pump processing unit, for providing separate compressed air sources; and a driving air source preprocessing unit, connected to the booster pump air control module and configured to provide the booster pump air control module with a compressed air source for the booster pump air control module to use in a manner of split-flow;

where the first booster pump processing unit includes:

a first air control booster pump equipped with a first compressed air inlet, a first test gas inlet, a first test gas outlet and a second offload port, where the first compressed air inlet is connected to the booster pump air control module and a fourth air control valve;

the second booster pump processing unit includes:

a second air control booster pump equipped with a second compressed air inlet, a second test gas inlet, a second test gas outlet and a third offload port, where the second compressed air inlet is connected to the booster pump air control module and a fifth air control valve.

DETAILED DESCRIPTION OF THE EMBODIMENTS

Embodiments of the present disclosure will be described hereunder in detail with reference to the drawings and examples.

Research on high-pressure hydrogen sealing components involves analysis of deterioration of material performance, detection of product sealing performance or other aspects. It is necessary to construct a test system capable of truly reflecting service conditions of a sealing member or a sealing material in high-pressure hydrogen environment to detect and evaluate sealing materials in a high-pressure hydrogen system, which is crucial to ensuring a long-term safe and reliable operation of a high-pressure hydrogen storage tank. Further, in consideration of characteristics such as a high-pressure hydrogen storage medium having a high pressure and the stored hydrogen being flammable and explosive, a corresponding safety protection and explosion-proof design needs to be configured for the test system, in addition to a pressurization system that meets requirements. At present, the existing test system is not mature enough to achieve simulation of service conditions in high-pressure hydrogen environment under an effective safety protection system.

The present disclosure provides a pressure-adjustable auxiliary control system for high-pressure gas sealing detection, which can achieve simulation of service conditions in high-pressure hydrogen environment under an effective safety protection system.

Figure 1:
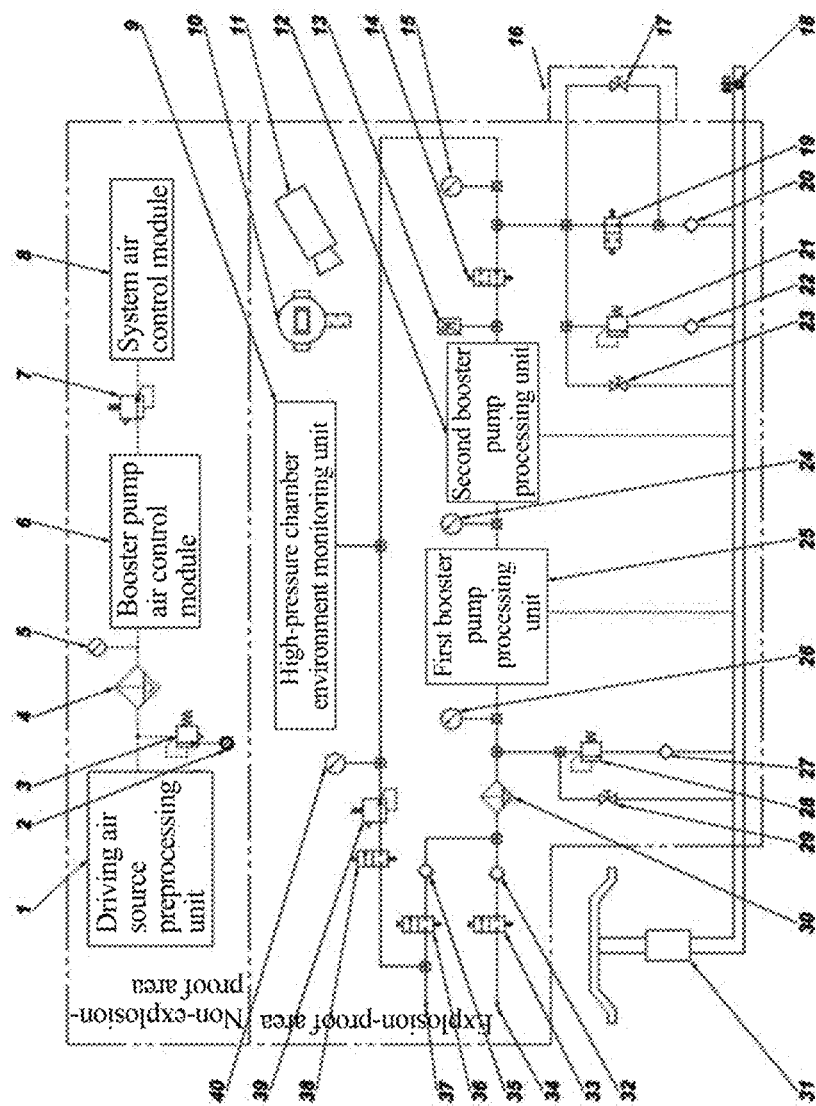
FIG. 1 is a partial schematic diagram illustrating an overall control circuit of a pressure-adjustable auxiliary control system for high-pressure gas sealing detection according to an embodiment of the present disclosure.
Figure 2:
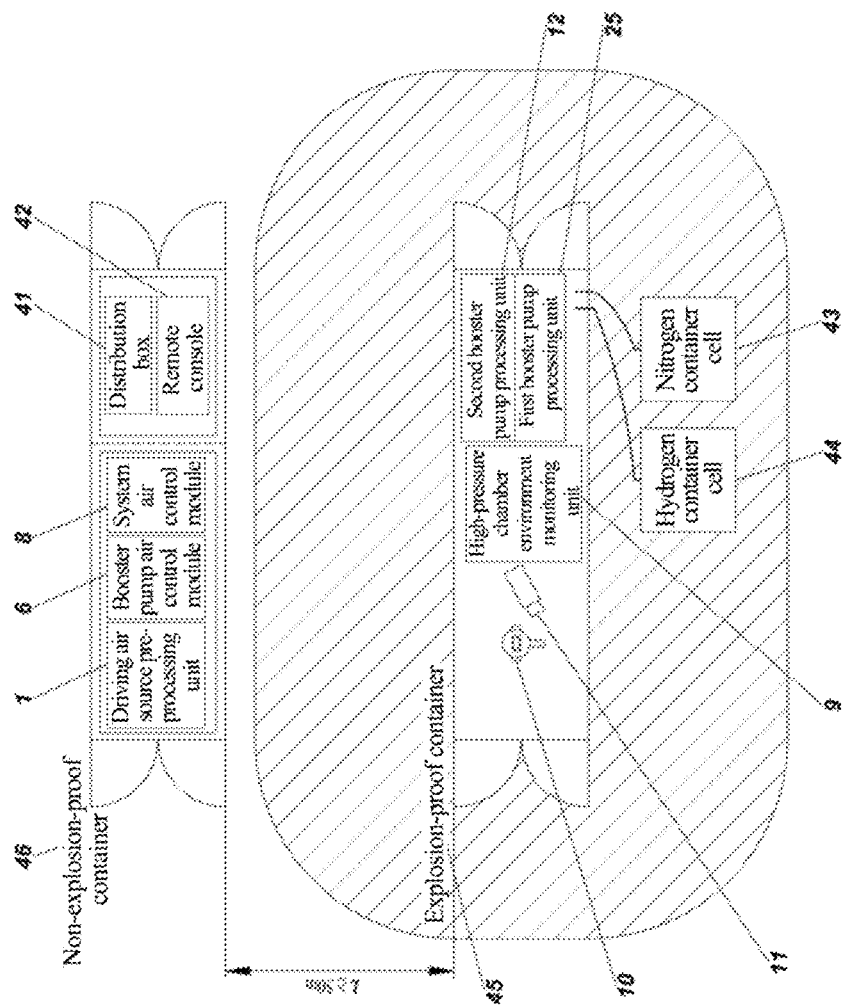
FIG. 2 is a schematic diagram illustrating overall structural arrangement of a pressure-adjustable auxiliary control system for high-pressure gas sealing detection according to an embodiment of the present disclosure.

As shown in FIG. 1 and FIG. 2, a pressure-adjustable auxiliary control system for high-pressure gas sealing detection according to an embodiment of the present disclosure, including:

a high-pressure chamber environment monitoring unit 9, configured to construct high-pressure test gas sealing environment and to test sealing performance of a sealing member;

a first gas pipeline, divided into a first branch of first gas and a second branch of the first gas, where the first branch of the first gas is connected to the high-pressure chamber environment monitoring unit 9 as a first gas replacement path; a first air control valve 38 is arranged in the first branch of the first gas, and a second air control valve 36 is arranged in the second branch of the first gas;

a second gas pipeline, in which a third air control valve 33 is arranged;

a test gas pressurization path, connected to the high-pressure chamber environment monitoring unit 9, where the second branch of the first gas together with the second gas pipeline is connected to the test gas pressurization path;

a first booster pump processing unit 25 and a second booster pump processing unit 12, arranged in the test gas pressurization path for pressurizing the test gas, where the first booster pump processing unit 25 is located upstream of the second booster pump processing unit 12, and a first offload port 18 is connected through offload paths which are equipped with valves and located on the test gas pressurization path at a position upstream of the first booster pump processing unit 25 and at a position downstream of the second booster pump processing unit 12 respectively;

a system air control module 8, configured for control of respective air control valves in the auxiliary control system;

a booster pump air control module 6, connected to the system air control module 8, the first booster pump processing unit 25 and the second booster pump processing unit 12, for providing separate compressed air sources; and a driving air source preprocessing unit 1, connected to the booster pump air control module 6 and configured to provide the booster pump air control module 6 with a compressed air source for the booster pump air control module 6 to use in a manner of split-flow.

The upstream to downstream direction is a direction in which the test gas flows when the pressure-adjustable auxiliary control system for the high-pressure gas sealing detection is in a normal operation.

Figure 6:
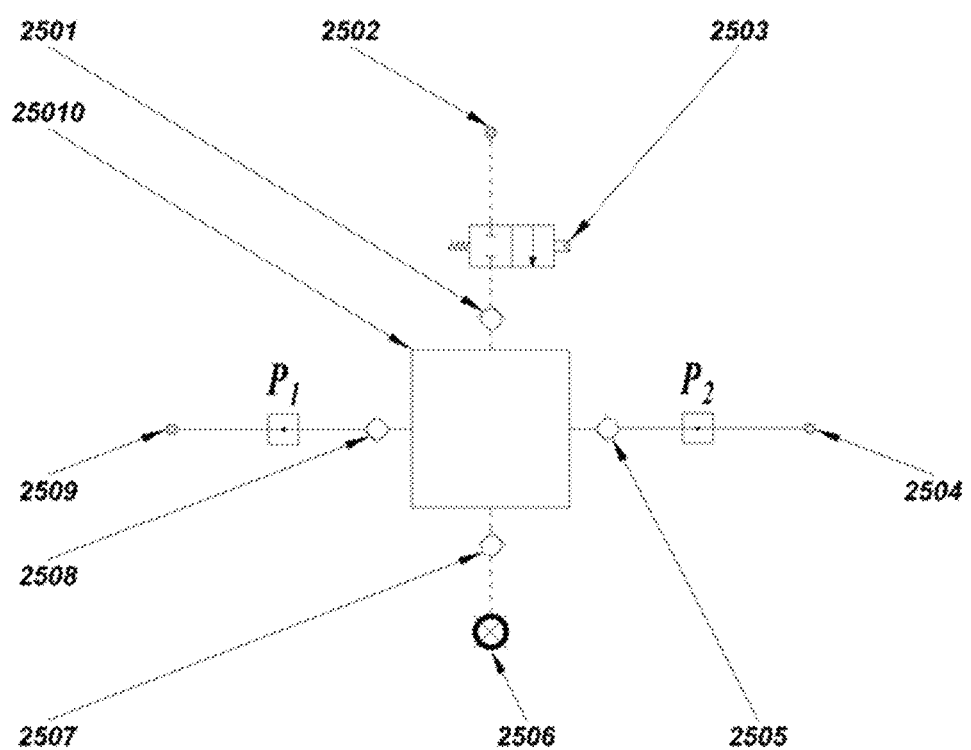
FIG. 6 is a schematic diagram illustrating a control circuit of a first booster pump processing unit according to an embodiment of the present disclosure.

With reference to FIG. 6, the first booster pump processing unit 25 includes: a first air control booster pump 25010 equipped with a first compressed air inlet 2502, a first test gas inlet 2509, a first test gas outlet 2504 and a second offload port 2506, where the first compressed air inlet 2502 is connected to the booster pump air control module 6 and a fourth air control valve 2503. The first compressed air inlet 2502, the first test gas inlet 2509, the first test gas outlet 2504 and the second offload port 2506 are connected to the first air control booster pump 25010 through a first one-way valve 2501, a second one-way valve 2508, a third one-way valve 2505 and a fourth one-way valve 2507, respectively; the second offload port 2506 is connected to the first offload port 18. A pipeline of the first booster pump processing unit 25 output from the second offload port 2506 constitutes an air control pressurization path of the first booster pump processing unit 25, and a pipeline output from the first test gas outlet 2504 constitutes a pressurization path of the booster pump processing unit 25.

Figure 7:
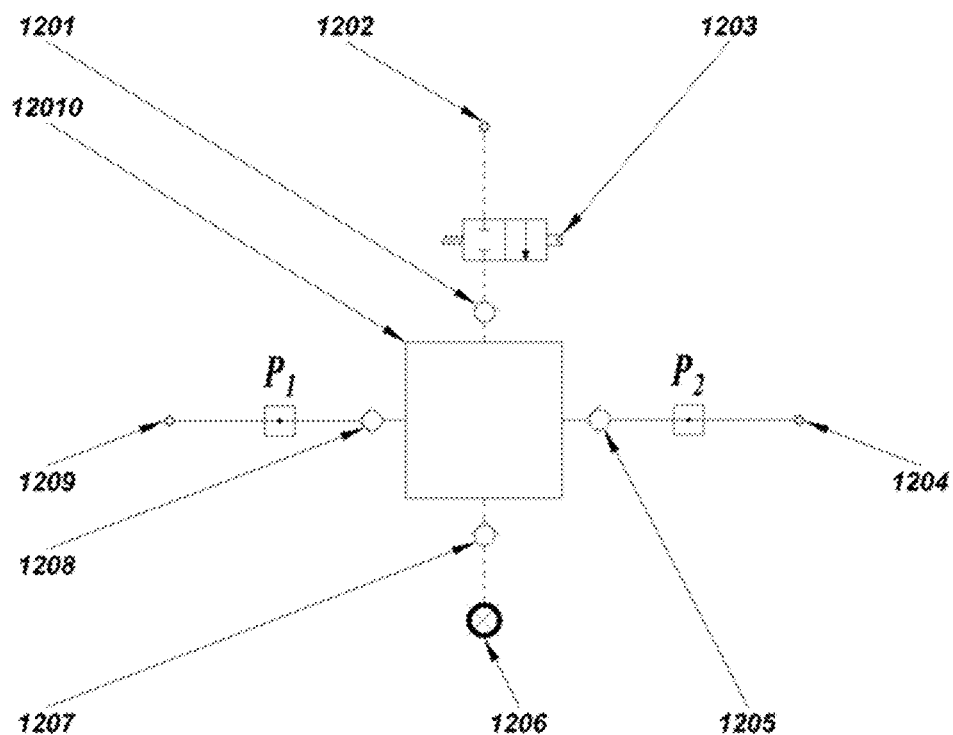
FIG. 7 is a schematic diagram illustrating a control circuit of a second booster pump processing unit according to an embodiment of the present disclosure.

With reference to FIG. 7, the second booster pump processing unit 12 includes: a second air control booster pump 12010 equipped with a second compressed air inlet 1202, a second test gas inlet 1209, a second test gas outlet 1204 and a third offload port 1206, where the second compressed air inlet 1202 is connected to the booster pump air control module 6 and a fifth air control valve 1203. The second compressed air inlet 1202, the second test gas inlet 1209, the second test gas outlet 1204 and the third offload port 1206 are connected to the second air control booster pump 12010 through a fifth one-way valve 1201, a sixth one-way valve 1208, a seventh one-way valve 1205 and an eighth one-way valve 1207, respectively; the third offload port 1206 is connected to the first offload port 18. A pipeline of the second booster pump processing unit 12 output from the third offload port 1206 constitutes an air control pressurization path of the second booster pump processing unit 12, and a pipeline output from the second test gas outlet 1204 constitutes a pressurization path of the second booster pump processing unit 12.

The first booster pump processing unit 25 has a pressurization ratio smaller than a pressurization ratio of the second booster pump processing unit 12.

With continued reference to FIG. 1 and FIG. 2, a first pressure relief valve 39 and a first pressure gauge 40 are further arranged in the first branch of the first gas; a ninth one-way valve 35 is further arranged in the second branch of the first gas; and a tenth one-way valve 32 is further arranged in the second gas pipeline. The high-pressure chamber environment monitoring unit 9, the first gas pipeline, the second gas pipeline, the first booster pump processing unit 25 and the second booster pump processing unit 12 each are arranged in an explosion-proof container 45; the system air control module 8, the booster pump air control module 6 and the driving air source preprocessing unit 1 each are arranged in a non-explosion-proof container 46; and the explosion-proof container 45 is spaced apart from the non-explosion-proof container 46 by a distance of ≥50 m.

The explosion-proof container 45 has, arranged therein, a second gas concentration detector 10 which is configured to detect whether there is a leak of second gas in the explosion-proof container 45 and a flame detector 11 which is configured to detect whether there is an open flame in the explosion-proof container 45; the second gas concentration detector 10 and the flame detector 11 each are in linkage with the booster pump air control module 6 and the system air control module 8, and the second gas concentration detector 10 and the flame detector 11 keep working during operation of the system. If there is a leak of second gas or an open flame in the explosion-proof container 45 prior to testing, an alarm alert is issued so that the auxiliary control system cannot be activated and can only be enabled after the situation is handled and the alert is released; if there is a leak of second gas or an open flame in the explosion-proof container 45 during testing, an alarm alert is issued so that control of the booster pump air control module 6 and the system air control module 8 is turned off automatically to offload the test gas in the high-pressure chamber environment monitoring unit 9.

A second gas inlet 34 of the second gas pipeline is connected to a second gas container cell 43, and a first gas inlet 37 of the first gas pipeline is connected to a first gas container cell 44.

A fourth filter 30 and a second pressure gauge 26 are arranged in the test gas pressurization path at a position located upstream of the first booster pump processing unit 25, and a first parallel structure is connected. The first parallel structure is formed by a first safety valve 28 and an eleventh one-way valve 27 being connected in series and then being connected in parallel with a first manual valve 29. The first parallel structure is connected at its one end to the first offload port 18 and connected at its other end to the test gas pressurization path between the fourth filter 30 and the second pressure gauge 26.

A temperature transmitter 13, a sixth air control valve 14 and a third pressure gauge 15 are arranged in the test gas pressurization path at a position located downstream of the second booster pump processing unit 12, and a second parallel structure is connected. The second parallel structure is formed by a first parallel substructure being connected in parallel with a second parallel substructure, where the first parallel substructure is formed by a second safety valve 21 and a twelfth one-way valve 22 being connected in series and then being connected in parallel with a second manual valve 23, and the second parallel substructure is formed by a seventh air control valve 19 and a third manual valve 17 being connected in parallel and then being connected in series with a thirteenth one-way valve 20. The second parallel structure is connected at its one end to the first offload port 18 and connected at its other end to the test gas pressurization path between the sixth air control valve 14 and the third pressure gauge 15.

The third manual valve 17 is located in a manual pressure relief box 16 which is mounted outside the explosion-proof container 45. The offload path is connected to a flame arrestor 31, and a fourth pressure gauge 24 is arranged in the test gas pressurization path at a position located between the first booster pump processing unit 25 and the second booster pump processing unit 12.

Figure 3:
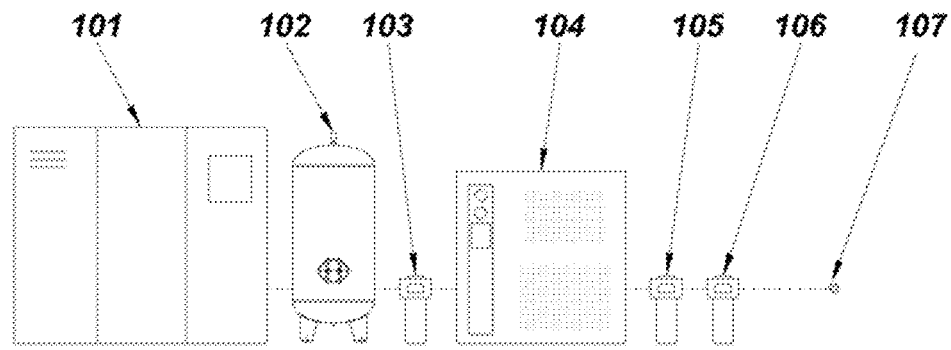
FIG. 3 is a schematic diagram illustrating structural arrangement of a driving air source preprocessing unit according to an embodiment of the present disclosure.

As shown in FIG. 3, the driving air source preprocessing unit 1 includes an air compressor 101 and a first compressed air source outlet 107 connected in sequence from upstream to downstream, and the compressed air source outlet 107 is connected to the booster pump air control module 6. The driving air source preprocessing unit 1 further includes a gas tank 102, a solid particle filter (also referred to as first filter) 103, a refrigeration dryer 104, a second filter 105 and a third filter 106 connected in sequence between the air compressor 101 and the first compressed air source outlet 107. The solid particle filter 103 has a filtration accuracy of ≤10 μm, the second filter 105 has a filtration accuracy of ≤5 μm, and the third filter 106 has a filtration accuracy of ≤1 μm.

Figure 4:
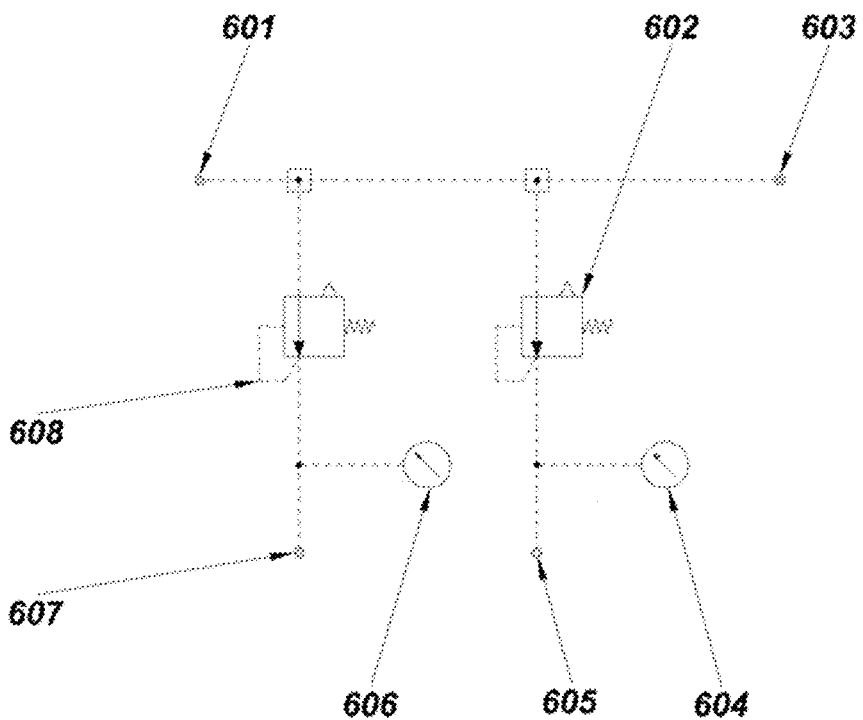
FIG. 4 is a schematic diagram illustrating a control circuit of a booster pump air control module according to an embodiment of the present disclosure.

As shown in FIG. 4, the booster pump air control module 6 includes a first compressed air source inlet 601, a pressure relief valve and a second compressed air source outlet. The first compressed air source inlet 601 is connected to the first compressed air source outlet 107 of the driving air source preprocessing unit 1, and the second compressed air source outlet is connected to the system air control module 8, the first booster pump processing unit 25 and the second booster pump processing unit 12, respectively.

The second compressed air source outlet includes:

a first sub-compressed air source outlet 607, connected to the first compressed air inlet 2502 of the first booster pump processing unit 25;

a second sub-compressed air source outlet 605, connected to the second compressed air inlet 1202 of the second booster pump processing unit 12; and a third sub-compressed air source outlet 603, connected to the system air control module 8.

A second pressure relief valve 608 and a fifth pressure gauge 606 are arranged in the pipeline between the first compressed air source inlet 601 and the first sub-compressed air source outlet 607, a third pressure relief valve 602 and a sixth pressure gauge 604 are arranged in the pipeline between the first compressed air source inlet 601 and the second sub-compressed air source outlet 605, and the third sub-compressed air source outlet 603 is connected to the first compressed air source inlet 601 and the system air control module 8.

Figure 5:
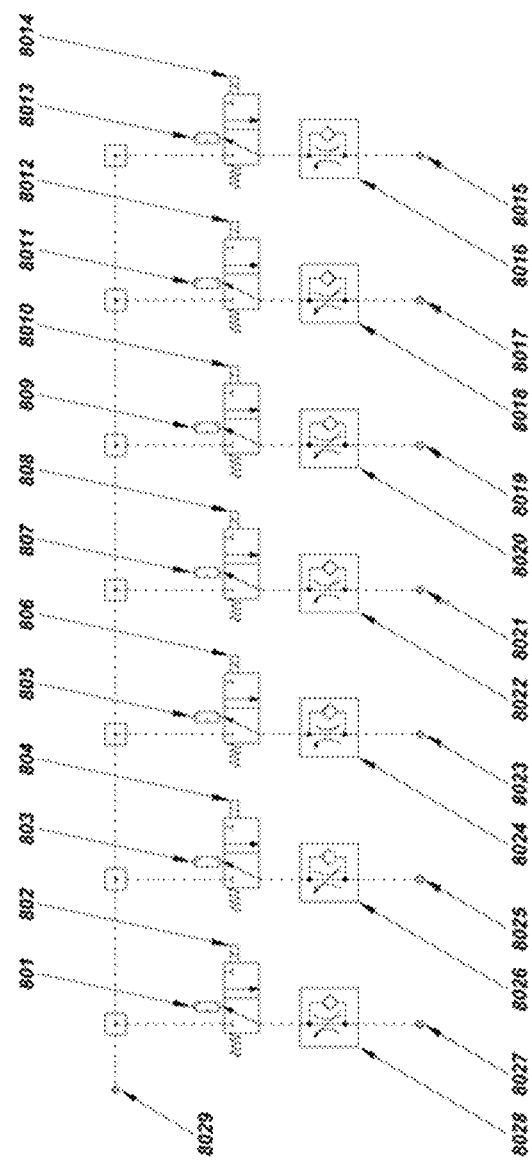
FIG. 5 is a schematic diagram illustrating a control circuit of a system air control module according to an embodiment of the present disclosure.

As shown in FIG. 5, the system air control module 8 includes:

a system compressed air inlet 8029, connected to the third sub-compressed air source outlet 603 of the booster pump air control module 6; and at least one set of system air control components, where each set of system air control components includes a system compressed air sub-outlet, and a solenoid valve connected between the system compressed air inlet 8029 and the system compressed air sub-outlet, for controlling air control valves of the auxiliary control system. Each set of system air control components further includes a muffler and a one-way throttle valve which are arranged between the system compressed air inlet 8029 and the system compressed air sub-outlet.

With continued reference to FIG. 1, a fifth filter 4 and a seventh pressure gauge 5 are arranged in the pipeline connected between the driving air source preprocessing unit 1 and the booster pump air control module 6, and a fourth offload port 2 is connected through a third safety valve 3; a fourth pressure relief valve 7 is arranged in the pipeline connected between the booster pump air control module 6 and the system air control module 8; and the fourth offload port 2 is connected to the first offload port 18. The fifth filter 4 has a filtration accuracy of ≤0.1 μm, and the third safety valve 3 is enabled at a pressure lower than a maximum allowable pressure difference of the fifth filter 4.

In an embodiment of the present disclosure, each module, unit, detector, pressure gauge, solenoid valve, air control valve, safety valve, pressure relief valve, and temperature transmitter used in the pressure-adjustable auxiliary control system for the high-pressure gas sealing detection are fed back to a remote console 42, and remote operations are achieved through the remote console 42.

Figure 8:
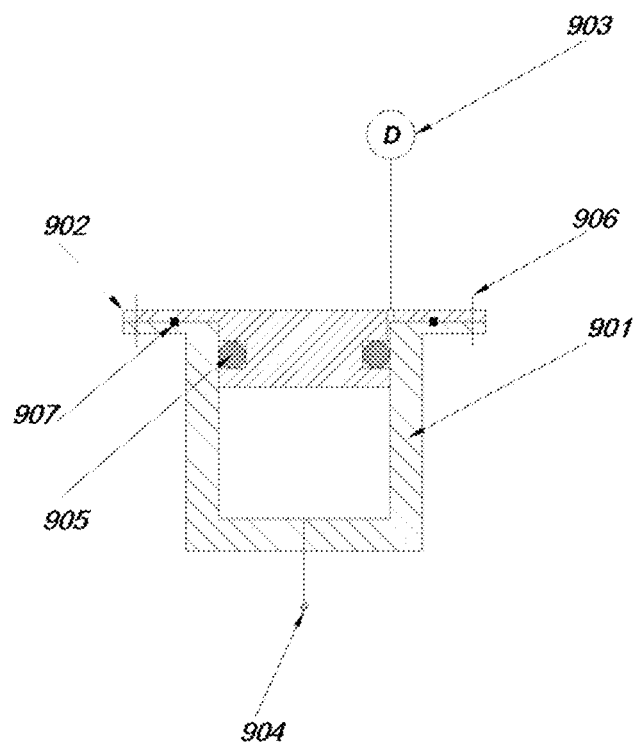
FIG. 8 is a schematic structural diagram of a high-pressure chamber environment monitoring unit according to an embodiment of the present disclosure.

With reference to FIG. 8, in an embodiment of the present disclosure, the high-pressure chamber environment monitoring unit 9 includes a high-pressure cavity 901, a cavity cover 902 and a leak detection element 903. The high-pressure cavity 901 has a gas inlet and outlet 904 and is connected to the first branch of the first gas and the test gas pressurization path described above through the gas inlet and outlet 904. The gas enters and exits the high-pressure cavity 901 through the gas inlet and outlet 904. The high-pressure cavity 901 has an opening at one end; and the cavity cover 902 is arranged at the opening of the high-pressure cavity 901 to close the opening. In addition, a mounting groove is arranged in the cavity cover 902 at a first position opposite to the high-pressure cavity 901 to facilitate the mounting of a sealing member 905 to be detected. A detection path in communication with the above-described mounting groove is further arranged in the cavity cover 902; and the leak detection element 903 is mounted in the detection path, for detecting the gas leaking from the high-pressure cavity 901 into the detection path. During testing, the sealing member 905 to be detected is placed in the mounting groove of the high-pressure cavity 901, and the cavity cover 902 is secured to the high-pressure cavity 901 by a bolt connector 906, thereby the sealing member 905 to be detected is secured in place. Hence, a clearance between the high-pressure cavity 901 and the cavity cover 902 is sealed by the sealing member 905 to be detected. In addition, in an embodiment of the present disclosure, the high-pressure chamber environment detection unit 9 further includes an auxiliary sealing member 907, in order to assist the leak detection element 903 in detecting a gas leak more reliably. The auxiliary sealing member 907 is arranged at a second position between the cavity cover 902 and the high-pressure cavity 901 so that the clearance between the cavity cover 902 and the high-pressure cavity 901 is sealed at the second position to prevent leaked gas from evacuating from the second position. The first position, the detection path and the second position described above are arranged in sequence along the flow direction of the gas in case of leakage. During testing, the test gas pressurized by the first booster pump processing unit 25 and the second booster pump processing unit 12 enters the high-pressure cavity 901 through the gas inlet and outlet 904, and the high-pressure environment is maintained after the test gas is pressurized to a preset high pressure. During testing, the leak detection element 903 may detect whether there is a leak of the test gas. In this process, generally, if there would be a failure in the sealing member 905 to be detected, a leak of the test gas may occur. Therefore, with detection from the leak detection element 903, it is possible to know whether there is a failure in the sealing member 905 to be detected. After the testing ends, the test gas in the high-pressure cavity 901 is discharged through the gas inlet and outlet 904.

In an embodiment of the present disclosure, the first gas may be nitrogen, the second gas may be hydrogen, and the test gas may be at least one of hydrogen and nitrogen. In addition, in an embodiment of the present disclosure, the test gas may also be helium, air or others.

The pressure-adjustable auxiliary control system for the high-pressure gas sealing detection according to the present disclosure adopts the booster pump air control module 6 and the system air control module 8 and uses the air source as a control medium through which system functions are implemented, which, on the basis of ensuring signal input on a control side and actions of an execution side, is different from a traditional method in which controlling is performed using a circuit system, thereby effectively reducing a possibility that the second gas is in contact with the power source and significantly guaranteeing safety of the test system. In the system pressurization part, a two-stage pressurization method is used; by means of the first booster pump processing unit 25 and the second booster pump processing unit 12, when the same pressure is constructed, the discharge temperature can be lowered so as to improve the safety of the test system during the testing process so that utilization of cylinder capacity is increased for the booster pump processing units and structure size is reduced, functioning to save power consumption and improve mechanical efficiency. The safety protection function of the test system is realized through the orderly design of auxiliary control components: all mechanical elements in the test system have a pressure grade higher than a pressure value used by the gas in that area, moreover, there is a certain safety factor to ensure that there will be no over-pressure risk; a safety valve together with a manual valve is provided at both an entrance and an exit of the test system to further ensure the safety of the system for prevention of an over-pressure; the test system is equipped with pressure gauges and temperature transmitters, which can enable over-pressure/under-pressure alarms and over-temperature alarms; when power is off, the test system may render an auto offload to avoid a pressure held in the components and occurrence of danger due to mishandling from an operator; the container is equipped with a second gas concentration detector and a flame detector, which are in linkage with the test system to ensure the safety of the system.

With continued reference to FIG. 1 and FIG. 2, an embodiment of the present disclosure provides a pressure-adjustable auxiliary control system for high-pressure gas sealing detection, where the first gas is nitrogen, the second gas is hydrogen, and the test gas is nitrogen/hydrogen. The pressure-adjustable auxiliary control system for the high-pressure gas sealing detection includes:

a driving air source preprocessing unit 1 configured to compress, store and filter air, and provide compressed air as a driving air source.

A booster pump air control module 6 is connected to the driving air source preprocessing unit 1, so that the driving air source preprocessing unit 1 provides a compressed air source to the booster pump air control module 6, and the booster pump air control module 6 performs split-flow on the compressed air source for separate delivery to a first booster pump processing unit 25, a second booster pump processing unit 12 and a system air control module 8 to provide the compressed air source to the first booster pump processing unit 25 and the second booster pump processing unit 12. The pipeline connected between the booster pump air control module 6 and the driving air source preprocessing unit 1 is arranged with a filter 4 and a pressure gauge 5, and is connected to an offload port 2 through a safety valve 3, where the filter 4 is configured for high-precision filtration of the compressed air, which is mainly configured to filter contaminants that may intrude into the booster pump air control module 6, the system air control module 8, the first booster pump processing unit 25, the second booster pump processing unit 12 and various air control valves, thereby providing a clean air source for them, ensuring action responses of execution side, and indirectly protecting the test system. The filter 4 has a filtration accuracy ≤0.1 µm. The safety valve 3 is configured to prevent overloading of the driving air source preprocessing unit 1 or breaking of a filtering core of the filter 4 due to a blockage in the filter 4, and should be enabled at a pressure slightly lower than a maximum allowable pressure difference of the filter 4. The pressure gauge 5 is configured for pressure detection, pressure feedback and over-pressure/under-pressure alarms.

The system air control module 8 is connected to the booster pump air control module 6, and is configured for control of respective air control valves in the system. A pressure relief valve 7 is arranged in the pipeline connected between the system air control module 8 and the booster pump air control module 6, and the pressure relief valve 7 is configured to reduce the pressure of the compressed air incorporated into the system air control module 8 and keep the pressure of the compressed air constant.

A high-pressure chamber environment monitoring unit 9 is configured to construct high-pressure hydrogen/nitrogen sealing environment and to detect sealing performance of a sealing member. The high-pressure chamber environment monitoring unit 9 may detect leakage of sealing members of different materials at different pressures. Rubber materials, metallic materials, non-metallic materials or others may be placed inside the high-pressure chamber environment monitoring unit 9 to study laws of deterioration of material performance at different pressures, pressure cycles and pressure holding times.

A nitrogen pipeline is divided into two branches including a first nitrogen branch and a second nitrogen branch. The first nitrogen branch is connected to the high-pressure chamber environment monitoring unit 9 as a nitrogen replacement path, and an air control valve 38, a pressure relief valve 39 and a pressure gauge 40 are arranged in the first nitrogen branch. An air control valve 36 and a one-way valve 35 are arranged in the second nitrogen branch.

The hydrogen pipeline has arranged therein an air control valve 33 and a one-way valve 32, which together with the second nitrogen branch is connected to a hydrogen/nitrogen pressurization path. The first booster pump processing unit 25 and the second booster pump processing unit 12 are arranged in sequence in the hydrogen/nitrogen pressurization path for pressurizing hydrogen/nitrogen, and the hydrogen/nitrogen pressurization path are connected to the high-pressure chamber environment monitoring unit 9; an offload port 18 is connected through offload paths which are equipped with valves and located on the hydrogen/nitrogen pressurization path at a position upstream of the first booster pump processing unit 25 and at a position downstream of the second booster pump processing unit 12 respectively; and the offload port 18 is connected to the offload port 2.

A filter 30 and a pressure gauge 26 are arranged in the hydrogen/nitrogen pressurization path at a position located upstream of the first booster pump processing unit 25, and a first parallel structure is connected. The first parallel structure is formed by a safety valve 28 and a one-way valve 27 being connected in series and then being connected in parallel with a manual valve 29. The first parallel structure is connected at its one end to the first offload port 18 and connected at its other end to the hydrogen/nitrogen pressurization path between the filter 30 and the pressure gauge 26. A temperature transmitter 13, an air control valve 14, and a pressure gauge 15 are arranged in the hydrogen/nitrogen pressurization path at a position located downstream of the second booster pump processing unit 12, and a second parallel structure is connected. The second parallel structure is formed by a first parallel substructure being connected in parallel with a second parallel substructure, where the first parallel substructure is formed by a safety valve 21 and a one-way valve 22 being connected in series and then being connected in parallel with a manual valve 23, and the second parallel substructure is formed by an air control valve 19 and a manual valve 17 being connected in parallel and then being connected in series with a one-way valve 20. The second parallel structure is connected at its one end to the first offload port 18 and connected at its other end to the hydrogen/nitrogen pressurization path between the air control valve 14 and the pressure gauge 15. The manual valve 17 is located in a manual pressure relief box 16 which is mounted outside an explosion-proof container 45; the offload path is connected to a flame arrestor 31; and a pressure gauge 24 is arranged in the hydrogen/nitrogen pressurization path at a position located between the first booster pump processing unit 25 and the second booster pump processing unit 12.

The pressure relief valve 39 is configured to reduce the pressure of the nitrogen incorporated into the high-pressure chamber environment monitoring unit 9 and keep the pressure of the nitrogen constant. The pressure gauge 40, the pressure gauge 26, the pressure gauge 24 and the pressure gauge 15 are configured for pressure detection, pressure feedback and over-pressure/under-pressure alarms. The air control valve 38, the air control valve 36, the air control valve 33, the air control valve 14 and the air control valve 19 are configured to achieve connection or disconnection between passages connected by valve bodies so that gas flowing direction are changed. The filter 30 is configured for ultra-high-precision filtration of hydrogen/nitrogen, which is mainly configured to filter contaminants that may intrude into the first booster pump processing unit 25, the second booster pump processing unit 12, the high-pressure chamber environment monitoring unit 9 and various air control valves, thereby providing a clean air source for them, protecting the first air control booster pump 25010 and the second air control booster pump 12010 from being scratched, and ensuring action responses of the execution side. The filter 30 has a filtration accuracy ≤0.01 µm. The one-way valve 35, the one-way valve 32, the one-way valve 27, the one-way valve 22 and the one-way valve 20 are configured to control gas flow directions and prevent the gas from backflowing. The safety valve 28 provides an overload protection at the gas inlet of the test system, and is in an OFF state when the system is working normally, whereas overflowing is enabled when the pressure at the system is greater than or equal to a set pressure. The safety valve 21 provides an overload protection when the test system is working, and is in an OFF state when the system is working normally, whereas overflowing is enabled to avoid an over-pressure in the system when the pressure at the system is greater than or equal to a set pressure. The manual valve 29 and the manual valve 23 are configured for manual offloads when the safety valve 28 and the safety valve 21 cannot be enabled, as well as the discharge of inside gas before the test system is activated or when a regular maintenance is performed. The manual valve 17 is configured for a manual offload in case of emergency. Such manual offload is a specific offload method when an auto offload path of the test system cannot operate normally. The manual pressure relief box 16 is mounted outside the explosion-proof container 45, so that the operator does not need to enter the explosion-proof container 45 when it is necessary to manually operate the manual valve 17 for offloading in case of emergency, thereby guaranteeing the safety of the operator and protecting the manual valve 17 from harsh outdoor conditions such as rain, mud, dust and sun. The temperature transmitter 13 is configured for temperature detection, temperature feedback and over-temperature alarms. The first offload port 18 is configured for centralized offloading of the gas in the test system. The flame arrestor 31 is configured to prevent flame of flammable gas and flammable liquid vapor from spreading, and prevent the flame of the gas from propagating to the pipeline of the entire test system after the flammable gas is ignited.

The high-pressure chamber environment monitoring unit 9, the nitrogen pipeline, the hydrogen pipeline, the first booster pump processing unit 25 and the second booster pump processing unit 12 as well as their corresponding valves and instruments each are arranged in the explosion-proof container 45, while the system air control module 8, the booster pump air control module 6 and the driving air source preprocessing unit 1 as well as their corresponding valves and instruments each are arranged in the non-explosion-proof container 46. The explosion-proof container 45 is spaced apart from the non-explosion-proof container 46 by a distance of ≥50 m. The explosion-proof container 45 has, arranged therein, a hydrogen concentration detector 10 which is configured to detect whether there is a leak of hydrogen in the explosion-proof container 45 and a flame detector 11 which is configured to detect whether there is an open flame in the explosion-proof container 45. The hydrogen concentration detector 10 and the flame detector 11 each are in linkage with the booster pump air control module 6 and the system air control module 8. The hydrogen concentration detector 10 and the flame detector 11 keep working during operation of the system. If there is a leak of hydrogen or an open flame in the explosion-proof container 45 prior to testing, an alarm alert is issued so that the test system cannot be activated and can only be enabled after the situation is handled and the alert is released; if there is a leak of hydrogen or an open flame in the explosion-proof container 45 during testing, an alarm alert is issued so that control of the booster pump air control module 6 and the system air control module 8 is turned off automatically to offload the test gas in the high-pressure chamber environment monitoring unit 9 through the air control valve 19 and the one-way valve 20. A hydrogen inlet 34 of the hydrogen pipeline is connected to a hydrogen container cell 43, and a nitrogen inlet 37 of the nitrogen pipeline is connected to a nitrogen container cell 44. The hydrogen container cell 43 is configured to provide a hydrogen source. The nitrogen container cell 44 is configured to provide a nitrogen source.

With reference to FIG. 3, the driving air source preprocessing unit 1 includes an air compressor 101, a gas tank 102, a solid particle filter 103, a refrigeration dryer 104, a second filter 105, a third filter 106 and a first compressed air source outlet 107 connected in sequence, whereby constituting a compressed air path. The air compressor 101 is configured to compress air. The gas tank 102 is configured to store compressed air. The solid particle filter 103 is configured for preliminary filtration of the compress aired to remove solid impurities and protect the refrigeration dryer 104 from inhaling large mechanical impurities. The refrigeration dryer 104 is configured to reduce the temperature of the compressed air and remove water vapor in the compressed air. The second filter 105 and the third filter 106 are configured for secondary filtration of the compressed air so that cleanness is ensured for the compressed air discharged from the first compressed air source outlet 107. The solid particle filter 103 has a filtration accuracy of ≤10 μm. The second filter 105 has a filtration accuracy of ≤5 μm. The third filter 106 has a filtration accuracy of ≤1 μm.

With reference to FIG. 4, the booster pump air control module 6 includes a first compressed air source inlet 601 connected to the first compressed air source outlet 107. The compressed air exiting the first compressed air source inlet 601 is divided into three branches: one branch of which is connected to a third sub-compressed air source outlet 603, another branch of which is connected to a first sub-compressed air source outlet 607 and has a pressure relief valve 608 and a pressure gauge 606 arranged in the connecting pipeline, and a third branch of which is connected to a second sub-compressed air source outlet 605 and has a pressure relief valve 602 and a pressure gauge 604 arranged in the connecting pipeline, whereby forming two booster pump air control paths feeding into the first booster pump processing unit 25 and the second booster pump processing unit 12 respectively. The pressure relief valve 608 is configured to reduce the pressure of the compressed air incorporated into the first booster pump processing unit 25 and keep the pressure of the compressed air constant. The pressure relief valve 602 is configured to reduce the pressure of the compressed air incorporated into the second booster pump processing unit 12 and keep the pressure of the compressed air constant. The pressure gauge 604 and the pressure gauge 606 are configured for pressure detection, pressure feedback and over-pressure/under-pressure alarms.

The first sub-compressed air source outlet 607 and the second sub-compressed air source outlet 605 use a parallel method to perform outputting, which can avoid interference between output air sources and effectively control actions of execution side such as the first booster pump processing unit 25 and the second booster pump processing unit 12. The booster pump air control module 6 is used and the air source is used as a control medium through which system functions are implemented, which, on the basis of ensuring signal input on a control side and actions of an execution side, is different from a traditional method in which controlling is performed using a circuit system, thereby effectively reducing a possibility that the hydrogen is in contact with the power source and significantly guaranteeing safety of the test system.

With reference to FIG. 5, the system air control module 8 includes a system compressed air inlet 8029 connected to the third sub-compressed air source outlet 603. The compressed air exiting the system compressed air inlet 8029 is divided into multiple branches. The output of each branch controls one air control valve to constitute an air control path for the system. Each branch is connected to a corresponding compressed air outlet and has a solenoid valve and a one-way throttle valve arranged in the connecting pipeline, plus a muffler may be mounted on the solenoid valve. In an embodiment of the present disclosure, the compressed air exiting the system compressed air inlet 8029 is divided into seven branches: a first branch of which is connected to a compressed air outlet 8027, and has arranged therein a muffler 801, a solenoid valve 802 and a one-way throttle valve 8028; a second branch of which is connected to a compressed air outlet 8025, and has arranged therein a muffler 803, solenoid valve 804 and a one-way throttle valve 8026; a third branch of which is connected to a compressed air outlet 8023, and has arranged therein a muffler 805, a solenoid valve 806 and a one-way throttle valve 8024; a fourth branch of which is connected to a compressed air outlet 8021, and has arranged therein a muffler 807, a solenoid valve 808 and a one-way throttle valve 8022; a fifth branch of which is connected to a compressed air outlet 8019, and has arranged therein a muffler 809, a solenoid valve 8010 and a one-way throttle valve 8020; a sixth branch of which is connected to a compressed air outlet 8017, and has arranged therein a muffler 8011, a solenoid valve 8012 and a one-way throttle valve 8018; a seventh branch of which is connected to a compressed air outlet 8015, and has arranged therein a muffler 8013, a solenoid valve 8014 and a one-way throttle valve 8016.

The solenoid valve 802, the solenoid valve 804, the solenoid valve 806, the solenoid valve 808, the solenoid valve 8010, the solenoid valve 8012 and the solenoid valve 8014 are configured to achieve connection or disconnection between passages connected by valve bodies so that the gas flowing directions are changed. The one-way throttle valve 8028, the one-way throttle valve 8026, the one-way throttle valve 8024, the one-way throttle valve 8022, the one-way throttle valve 8020, the one-way throttle valve 8018 and the one-way throttle valve 8016 are configured to control gas flowing directions or gas flow rates. The muffler 801, the muffler 803, the muffler 805, the muffler 807, the muffler 809, the muffler 8011 and the muffler 8013 are configured to reduce gas discharge velocities and power so as to achieve the purpose of noise reduction.

After the solenoid valve 802, the solenoid valve 804, the solenoid valve 806, the solenoid valve 808 and the solenoid valve 8010 are powered on, an air source flows out and the air control valve 38, the air control valve 36, the air control valve 33, the air control valve 2503 and the air control valve 1203 can be quickly reversed respectively through corresponding one-way valves within the one-way throttle valve 8028, the one-way throttle valve 8026, the one-way throttle valve 8024, the one-way throttle valve 8022 and the one-way throttle valve 8020, thereby meeting requirements for fast actions of the execution side; after they are powered off, the flow rate at which the air source is discharged may be controlled by corresponding throttle valves within the one-way throttle valve 8028, the one-way throttle valve 8026, the one-way throttle valve 8024, the one-way throttle valve 8022 and the one-way throttle valve 8020 collaborating with the muffler 801, the muffler 803, the muffler 805, the muffler 807 and the muffler 809, thereby respectively controlling reset speed of the air control valve 38, the air control valve 36, the air control valve 33, the air control valve 2503 and the air control valve 1203, avoiding the impacts due to rapid reset of the air control valves, and functioning to protect the air control valves.

The solenoid valve 8012 controls the action of the air control valve 14. After the test gas in the high-pressure chamber environment monitoring unit 9 is pressurized to a desirable pressure, the air control valve 14 is reversed, and the hydrogen/nitrogen pressurization path is disconnected, so that the high-pressure chamber environment monitoring unit 9 keeps the pressure. Since the pressure is high at this time, the air control valve 14 needs to be reversed at a slower speed to avoid occurrence of large pressure fluctuations in the pipeline and the high-pressure chamber environment monitoring unit 9. If it is necessary to continue to increase the pressure of the test gas within the high-pressure chamber environment monitoring unit 9 or carry out a next round of pressurization test, the air control valve 14 needs to be quickly reset so that the hydrogen/nitrogen pressurization path is connected. Therefore, after the solenoid valve 8012 is powered on, an air source flows out, and the reversing speed of the air control valve 14 may be controlled through the throttle valve within the one-way throttle valve 8018; after the solenoid valve 8012 is powered off, the air source may be discharged quickly by the one-way valve within the one-way throttle valve 8018 collaborating with the muffler 8011, and the air control valve 14 is quickly reset.

The solenoid valve 8014 controls the action of the air control valve 19. The air control valve 19 is located on the offload path. Before the test is started, the air control valve 19 needs to be reversed in advance and the offload path is disconnected, and at this time, the air control valve 19 may be reversed at a slower speed, functioning to protect the air control valve. After the test is ended, it is necessary to empty the test gas in the high-pressure chamber environment monitoring unit 9 in time, and the air control valve 19 needs to be quickly reset to allow the offload path to be connected. Especially when circuit failures, such as that the system is powered off, during the test are encountered, the air control valve 19 can be quickly reset so that the offload path is connected and the test gas in the high-pressure chamber environment monitoring unit 9 is discharged in time to avoid dangers. Therefore, after the solenoid valve 8014 is powered on, an air source flows out, and the reversing speed of the air control valve 19 may be controlled through the throttle valve within the one-way throttle valve 8016; after the solenoid valve 8014 is powered off, the air source may be discharged quickly by the one-way valve within the one-way throttle valve 8016 collaborating with the muffler 8013, and the air control valve 19 is quickly reset.

The system air control module 8 is used and the air source is used as a control medium through which system functions are implemented, which, on the basis of ensuring signal input on a control side and actions of an execution side, is different from a traditional method in which controlling is performed using a circuit system, thereby effectively reducing a possibility that the hydrogen is in contact with the power source and significantly guaranteeing safety of the test system.

With reference to FIG. 6, the first booster pump processing unit 25 includes a first air control booster pump 25010 equipped with a first compressed air inlet 2502, a first hydrogen/nitrogen inlet 2509, a first hydrogen/nitrogen outlet 2504 and a second offload port 2506. The first compressed air inlet 2502 is connected to the first sub-compressed air source outlet 607, and the first compressed air inlet 2502 is connected with an air control valve 2503 and a one-way valve 2501; the first hydrogen/nitrogen inlet 2509 is connected with a one-way valve 2508, and the first hydrogen/nitrogen outlet 2504 is connected with a one-way valve 2505; the second offload port 2506 is connected with a one-way valve 2507, and the second offload port 2506 is connected to the first offload port 18. A pipeline output from the second offload port 2506 constitutes an air control pressurization path of the first booster pump processing unit 25, and a pipeline output from the first hydrogen/nitrogen outlet 2504 constitutes a pressurization path of the first booster pump processing unit 25. The first hydrogen/nitrogen inlet 2509 is connected to the pressure gauge 26, and the first hydrogen/nitrogen outlet 2504 is connected to the pressure gauge 24.

The one-way valve 2501, the one-way valve 2505, the one-way valve 2507 and the one-way valve 2508 are configured to control gas flowing directions and prevent the gas from backflowing. The air control valve 2503 is configured to achieve connection or disconnection between passages connected by valve bodies so that the gas flowing direction is changed. The first air control booster pump 25010 uses compressed air for pressurization.

When the first booster pump processing unit 25 is in use, the solenoid valve 808 is powered on, an air source flows out, the air control valve 2503 is quickly reversed, and the air control pressurization path of the first booster pump processing unit 25 is enabled; the hydrogen/nitrogen incorporated from the first hydrogen/nitrogen inlet 2509 is pressurized by the first air control booster pump 25010, the pressure at the first hydrogen/nitrogen inlet 2509 is P1, and the pressure at the first hydrogen/nitrogen outlet 2504 is P2; the compressed air for pressurization flows into the second offload port 2506 for offloading to complete a pressurization action; after the test system is pressurized to a desirable pressure, the solenoid valve 808 is powered off, the air control valve 2503 is reset, and the first booster pump processing unit 25 stops pressurization.

With reference to FIG. 7, the second booster pump processing unit 12 includes a second air control booster pump 12010 equipped with a second compressed air inlet 1202, a second hydrogen/nitrogen inlet 1209, a second hydrogen/nitrogen outlet 1204 and a third offload port 1206. The second compressed air inlet 1202 is connected to the second sub-compressed air source outlet 605, and the second compressed air inlet 1202 is connected with an air control valve 1203 and a one-way valve 1201; the second hydrogen/nitrogen inlet 1209 is connected with a one-way valve 1208, and the second hydrogen/nitrogen outlet 1204 is connected with a one-way valve 1205; the third offload port 1206 is connected with a one-way valve 1207, and the third offload port 1206 is connected to the first offload port 18. A pipeline output from the third offload port 1206 constitutes an air control pressurization path of the second booster pump processing unit 12, and a pipeline output from the second hydrogen/nitrogen outlet 1204 constitutes a pressurization path of the second booster pump processing unit 12. The second hydrogen/nitrogen inlet 1209 is connected to the pressure gauge 24, and the second hydrogen/nitrogen outlet 1204 is connected to the temperature transmitter 13.

The one-way valve 1201, the one-way valve 1205, the one-way valve 1207 and the one-way valve 1208 are configured to control the gas flowing directions and prevent the gas from backflowing. The air control valve 1203 is configured to achieve connection or disconnection between passages connected by valve bodies so that the gas flowing direction is changed. The second air control booster pump 12010 uses compressed air for pressurization.

When the second booster pump processing unit 12 is in use, the solenoid valve 8010 is powered on, an air source flows out, the air control valve 1203 is quickly reversed, and the air control pressurization path of the second booster pump processing unit 12 is enabled; the hydrogen/nitrogen incorporated from the second hydrogen/nitrogen inlet 1209 is pressurized by the second air control booster pump 12010, the pressure at the second hydrogen/nitrogen inlet 1209 is P2, and the pressure at the second hydrogen/nitrogen outlet 1204 is P3; the compressed air for pressurization flows into the third offload port 1206 for offloading to complete a pressurization action. After the test system is pressurized to a desirable pressure, the solenoid valve 8010 is powered off, the air control valve 1203 is reset, and the second booster pump processing unit 12 stops pressurization.

The first booster pump processing unit 25 has a pressurization ratio smaller than a pressurization ratio of the second booster pump processing unit 12.

When the solenoid valve 808 is powered on and the solenoid valve 8010 is powered off, the first booster pump processing unit 25 is used alone to pressurize the test system. When the solenoid valve 808 is powered off and the solenoid valve 8010 is powered on, the second booster pump processing unit 12 is used alone to pressurize the test system. When the solenoid valve 808 is powered on and the solenoid valve 8010 is powered on, the first booster pump processing unit 25 and the second booster pump processing unit 12 are jointly used to pressurize the test system. When the first booster pump processing unit 25 or the second booster pump processing unit 12 is used alone to construct a relative low pressure in the high-pressure chamber environment monitoring unit 9, the constructed final pressure is controlled by virtue of the pressure gauge 15 so as to study sealing performance of a sealing member and laws of deterioration of material performance in a range of relative low pressures (50 MPa~100 MPa) (at different pressures, pressure cycles, and pressure holding times). When the first booster pump processing unit 25 or the second booster pump processing unit 12 are used simultaneously to construct a high pressure in the high pressure chamber environment monitoring unit 9, and the constructed final pressure is controlled by virtue of the pressure gauge 15 so as to study sealing performance of a sealing member and laws of deterioration of material performance in a range of high pressures (200 MPa and above) (at different pressures, pressure cycles, and pressure holding times). In particular, a two-stage pressurization method is used for the range of high pressures, and by means of the first booster pump processing unit 25 and the second booster pump processing unit 12, when a same pressure is constructed, the discharge temperature can be lowered so as to improve the safety of the test system during the testing process so that utilization of cylinder capacity is increased and structure size is reduced for the booster pump processing units, functioning to save power consumption and improve mechanical efficiency.

The test method according to the present disclosure will be further described in detail below in conjunction with examples, but specific implementations of the present disclosure are not limited to just this one.

Step 1: assembly and inspection. After the preparation of the high-pressure chamber environment monitoring unit 9 is completed, an inspection is performed on connection of each component in the test system, and it is determined through the hydrogen concentration detector 10 and the flame detector 11 whether the test environment is safe.

Step 2: turning on and off of paths of the valves. The manual valve 29, the manual valve 23 and the manual valve 17 are turned off; the solenoid valve 8014 is kept in a power-on state and the air control valve 19 is reversed.

Step 3: nitrogen replacement. The solenoid valve 802 is powered on, and the air control valve 38 is reversed; when the pressure of the nitrogen replacement path detected and fed back by the pressure gauge 40 reaches a set value, the solenoid valve 802 is powered off and the air control valve 38 is reset; the solenoid valve 8014 is powered off and the air control valve 19 is reset; when the pressure of the offload path of the test system detected and fed back by the pressure gauge 15 is zero, the solenoid valve 8014 is kept in a power-on state and the air control valve 19 is reversed; after the above operations are cycled for 2 to 3 times or more, the solenoid valve 802 is kept in a power-off state.

Step 4: gas pressurization. Reference may be made to Table 1, through power-on/power-off of corresponding solenoid valves, testing pressures in a range of relative low pressures (50 MPa~100 MPa) and in a range of high pressures (200 MPa and above) are achieved for the test gas in the high-pressure chamber environment monitoring unit 9, and the constructed final pressure is controlled by virtue of the pressure gauge 15.

TABLE 1

Description on implementation of gas pressurization

| | Test Medium | | | | | |
|---|---|---|---|---|---|---|
| | Nitrogen | | | Hydrogen | | |
| | Situation on control of valve | | | | | |
| Test pressure | Solenoid valve 804 | Solenoid valve 808 | Solenoid valve 8010 | Solenoid valve 806 | Solenoid valve 808 | Solenoid valve 8010 |
| Low pressure | Power on | Power on | Power off | Power on | Power on | Power off |
| | Power on | Power off | Power on | Power on | Power off | Power on |
| High pressure | Power on | Power on | Power on | Power on | Power on | Power on |

When the solenoid valve 804 is powered on, an air source flows out, and the air control valve 36 is quickly reversed; when the solenoid valve 804 is powered off, the air control valve 36 is reset. When the solenoid valve 806 is powered on, an air source flows out, and the air control valve 33 is quickly reversed; when the solenoid valve 806 is powered off, the air control valve 33 is reset. When the solenoid valve 808 is powered on, an air source flows out, and the air control valve 2503 is quickly reversed; when the solenoid valve 808 is powered off, the air control valve 2503 is reset. When the solenoid valve 8010 is powered on, an air source flows out, and the air control valve 1203 is quickly reversed; when the solenoid valve 8010 is powered off, the air control valve 1203 is reset.

Step 5: pressure holding test. Continued from step 4, after the pressure gauge 15 detects that the test pressure in the high-pressure chamber environment monitoring unit 9 reaches a set value, the solenoid valve 8012 is kept in a power-on state, and the air control valve 14 is reversed; the solenoid valve 804, the solenoid valve 806, the solenoid valve 808 and the solenoid valve 8010 are powered off, and the air control valve 36, the air control valve 33, the air control valve 2503 and the air control valve 1203 are reset; the pressure holding time can be set as required; the situation on the sealing of the sealing member at this time is determined by the high-pressure chamber environment monitoring unit 9.

Step six: pressure cycling test. Continued from step 4, after the pressure gauge 15 detects that the test pressure in the high-pressure chamber environment monitoring unit 9 reaches a set value, the solenoid valve 8012 is kept in a power-on state, and the air control valve 14 is reversed; the solenoid valve 804, the solenoid valve 806, the solenoid valve 808 and the solenoid valve 8010 are powered off, the air control valve 36, the air control valve 33, the air control valve 2503 and the air control valve 1203 are reset; the solenoid valve 8014 is powered off, the air control valve 19 is quickly reset, and the test gas in the high-pressure chamber environment monitoring unit 9 flows into the first offload port 18 via the one-way valve 20 for offloading; when the pressure of the offload path of the test system detected and fed back by the pressure gauge 15 is zero, the solenoid valve 8014 is kept in a power-on state, and the air control valve 19 is reversed.

Repeat Step 4 and Step 6 to achieve a pressure cycle, and the number of pressure cycles can be set as required; at this time, the situation on the sealing of the sealing member is determined by the high-pressure chamber environment monitoring unit 9.

Step 7: system offload. After the pressure holding test and the pressure cycling test end, the solenoid valve 8014 is powered off, the air control valve 19 is quickly reset, and the test gas in the high-pressure chamber environment monitoring unit 9 flows into the first offload port 18 via the one-way valve 20 for offloading; the solenoid valve 8012 is powered off, the air control valve 14 is reset, the test gas remained in the first booster pump processing unit 25, the second booster pump processing unit 12 and valves in the hydrogen/nitrogen pressurization path flows into the first offload port 18 via the one-way valve 20 for offloading; when the pressure of the offload path of the test system detected and fed back by the pressure gauge 26, the pressure gauge 24 and the pressure gauge 15 is zero, the solenoid valve 8014 is kept in a power-on state and the air control valve 19 is reversed.

Step 8: nitrogen purging. The solenoid valve 804 is powered on, an air source flows out, the air control valve 36 is quickly reversed, and nitrogen is incorporated in to perform nitrogen purging on the hydrogen/nitrogen pressurization path, valves and the high-pressure chamber environment monitoring unit 9; after a period of time, the solenoid valve 804 is powered off and the air control valve 36 is reset, and the solenoid valve 8014 is powered off, the air control valve 19 is quickly reset, and the nitrogen for purging flows into the first offload port 18 via the one-way valve 20 for offloading; when the pressure of the offload path of the test system detected and fed back by the pressure gauge 26, the pressure gauge 24 and the pressure gauge 15 is zero, the solenoid valve 8014 is kept in a power-on state, and the air control valve 19 is reversed.

Step 9: system shutdown. Repeat Step 8 for 2 to 3 times, upon confirmation that the pressure detected and fed back by the pressure gauge 26, the pressure gauge 24 and the pressure gauge 15 is "zero", the solenoid valve 8014 is powered off and the air control valve 19 is quickly reset; the manual valve 29, the manual valve 23 and the manual valve 17 are confirmed to be in an OFF state; the solenoid valve 802, the solenoid valve 804, the solenoid valve 806, the solenoid valve 808, the solenoid valve 8010, the solenoid valve 8012 and the solenoid valve 8014 are confirmed to be in a power-off state; the main power supply of the test system are turned off.

The solenoid valve 8014 can quickly reset the air control valve 19 when the test system is powered off. The gas of the test system flows into the first offload port 18 via the one-way valve 20 for offloading to render an "auto offload" in a power-off state and to avoid a pressure held in the components and occurrence of danger due to mishandling from an operator.

The modules, units, detectors, pressure gauges, solenoid valves, air control valves, safety valves, pressure relief valves, temperature transmitters or the like for the test system are all fed back to a remote console 42, and remote operations may be achieved through the remote console 42.

All parts in the test system have an explosion-proof grade (200 MPa and above) that meets the high pressure requirements.

All parts in the test system have a pressure grade higher than a pressure value used by the gas in that area, moreover, there is a certain safety factor to ensure that there will be no over-pressure risk.

All parts in the test system are at ground potential during their normal operations, and the resistance with the grounding pole is less than 1052.

The high-pressure gas tested in the present disclosure is not limited to hydrogen or nitrogen, which may also be helium, air or others.

The present disclosure has the following working principle: the booster pump air control module 6 and the system air control module 8 are used and the air source is used as a control medium through which system functions are implemented, which, on the basis of ensuring signal input on a control side and actions of an execution side, is different from a traditional method in which controlling is performed using a circuit system, thereby effectively reducing a possibility that hydrogen is in contact with the power source and significantly guaranteeing safety of the test system. In the system pressurization part, a two-stage pressurization method is used; by means of the first booster pump processing unit 25 and the second booster pump processing unit 12, when a same pressure is constructed, the discharge temperature can be lowered so as to improve the safety of the test system during the testing process so that utilization of cylinder capacity is increased and structure size is reduced for the booster pump processing units, functioning to save power consumption and improve mechanical efficiency. The safety protection function of the test system is realized through the orderly design of auxiliary control components: all mechanical elements in the test system have a pressure grade higher than a pressure value used by the gas in that area, moreover, there is a certain safety factor to ensure that there will be no over-pressure risk; a safety valve together with a manual valve is provided at both an entrance and an exit of the test system to further ensure the safety of the system for prevention of an over-pressure; the test system is equipped with pressure gauges and temperature transmitters, which can enable over-pressure/under-pressure alarms and over-temperature alarms; when power is off, the test system may render an auto offload to avoid a pressure held in the components and occurrence of danger due to mishandling from an operator; the container is equipped with a hydrogen concentration detector and a flame detector, which are in linkage with the test system to ensure the safety of the system.

The invention claimed is:

1. A pressure-adjustable auxiliary control system for high-pressure gas sealing detection, comprising:
    a high-pressure chamber environment monitoring unit, configured to test sealing performance of a sealing member in a high-pressure test gas sealing environment with a test gas pressure of equal to or greater than 200 MPa;
    a first gas pipeline, divided into a first branch of the first gas pipeline and a second branch of the first gas pipeline, wherein the first branch of the first gas pipeline is connected to the high-pressure chamber environment monitoring unit as a first gas replacement path, a first air control valve is arranged in the first branch of the first gas pipeline, and a second air control valve is arranged in the second branch of the first gas pipeline;
    a second gas pipeline, in which a third air control valve is arranged;
    a test gas pressurization path, connected to the high-pressure chamber environment monitoring unit, wherein the second branch of the first gas pipeline together with the second gas pipeline is connected to the test gas pressurization path;
    a first booster pump processing unit and a second booster pump processing unit, arranged in the test gas pressurization path for pressurizing a test gas, wherein the first booster pump processing unit is located upstream of the second booster pump processing unit, and a first offload port is connected through offload paths located on the test gas pressurization path at a position upstream of the first booster pump processing unit and at a position downstream of the second booster pump processing unit respectively;
    a system air control module, configured for control of respective air control valves in the auxiliary control system; wherein the system air control module comprises: a system compressed air inlet, connected to a booster pump air control module; and at least one set of system air control components, wherein each set of system air control components comprises one system compressed air sub-outlet, and a solenoid valve connected between the system compressed air inlet and the system compressed air sub-outlet, for controlling air control valves of the auxiliary control system; wherein each set of system air control components further comprises a muffler and a one-way throttle valve which are arranged between the system compressed air inlet and the system compressed air sub-outlet;
    the booster pump air control module, connected to the system air control module, the first booster pump processing unit and the second booster pump processing unit, and configured to provide a compressed air source supplied to the system air control module, the first booster pump processing unit and the second booster pump processing unit separately; wherein the booster pump air control module comprises a first compressed air source inlet, a pressure relief valve and a second compressed air source outlet; wherein the first compressed air source inlet is connected to a driving air source preprocessing unit, and the second compressed air source outlet is connected to the system air control module, the first booster pump processing unit, and the second booster pump processing unit, respectively; wherein the second compressed air source outlet comprises: a first sub-compressed air source outlet, connected to a first compressed air inlet of the first booster pump processing unit; a second sub-compressed air source outlet, connected to a second compressed air inlet of the second booster pump processing unit; and a third sub-compressed air source outlet, connected to the system air control module; wherein a second pressure relief valve and a fifth pressure gauge are arranged in a pipeline between the first compressed air source inlet and the first sub-compressed air source outlet, a third pressure relief valve and a sixth pressure gauge are arranged in a pipeline between the first compressed air source inlet and the second sub-compressed air source outlet, and the third sub-compressed air source outlet is connected to the first compressed air source inlet and the system air control module; and the driving air source preprocessing unit, connected to the booster pump air control module and configured to provide the booster pump air control module with the compressed air source for supplying a compressed air to the system air control module, the first booster pump processing unit and the second booster pump processing unit separately; wherein the driving air source preprocessing unit comprises an air compressor and the first compressed air source outlet connected in sequence from upstream to downstream, and the first compressed air source outlet is connected to the booster pump air control module; wherein the driving air source preprocessing unit further comprises a gas tank, a first filter, a refrigeration dryer, a second filter and a third filter connected in sequence between the air compressor and the first compressed air source outlet; wherein the first filter is configured for a preliminary filtration of the compressed air to remove solid impurities and protect the refrigeration dryer from inhaling mechanical impurities; the second filter and the third filter are configured for a secondary filtration of the compressed air so that cleanness is ensured for the compressed air discharged from the first compressed air source outlet;

wherein the first booster pump processing unit comprises:

a first air control booster pump equipped with the first compressed air inlet, a first test gas inlet, a first test gas outlet and a second offload port, wherein the first compressed air inlet is connected to the booster pump air control module and a fourth air control valve;

the second booster pump processing unit comprises:

a second air control booster pump equipped with the second compressed air inlet, a second test gas inlet, a second test gas outlet and a third offload port, wherein the second compressed air inlet is connected to the booster pump air control module and a fifth air control valve.

2. The pressure-adjustable auxiliary control system for the high-pressure gas sealing detection according to claim 1, wherein the first gas is nitrogen, a second gas is hydrogen; and the test gas is hydrogen or nitrogen.

3. The pressure-adjustable auxiliary control system for the high-pressure gas sealing detection according to claim 1, wherein the first compressed air inlet, the first test gas inlet, the first test gas outlet and the second offload port are connected to the first air control booster pump through a first one-way valve, a second one-way valve, a third one-way valve and a fourth one-way valve, respectively; the second offload port is connected to the first offload port;

a pipeline of the first booster pump processing unit output from the second offload port constitutes an air control pressurization path of the first booster pump processing unit, and a pipeline output from the first test gas outlet constitutes a pressurization path of the booster pump processing unit;

the second compressed air inlet, the second test gas inlet, the second test gas outlet and the third offload port are connected to the second air control booster pump through a fifth one-way valve, a sixth one-way valve, a seventh one-way valve and an eighth one-way valve, respectively;

the third offload port is connected to the first offload port;

a pipeline of the second booster pump processing unit output from the third offload port constitutes an air control pressurization path of the second booster pump processing unit, and a pipeline output from the second test gas outlet constitutes a pressurization path of the second booster pump processing unit.

4. The pressure-adjustable auxiliary control system for the high-pressure gas sealing detection according to claim 1, wherein a first pressure relief valve and a first pressure gauge are further arranged in the first branch of the first gas pipeline; a ninth one-way valve is further arranged in the second branch of the first gas pipeline; a tenth one-way valve is further arranged in the second gas pipeline; and the offload path is an offload path equipped with a valve.

5. The pressure-adjustable auxiliary control system for the high-pressure gas sealing detection according to claim 1, wherein the high-pressure chamber environment monitoring unit, the first gas pipeline, the second gas pipeline, the first booster pump processing unit and the second booster pump processing unit each are arranged in an explosion-proof container; the system air control module, the booster pump air control module and the driving air source preprocessing unit each are arranged in a non-explosion-proof container; and the explosion-proof container is spaced apart from the non-explosion-proof container by a distance of ≥50 m.

6. The pressure-adjustable auxiliary control system for the high-pressure gas sealing detection according to claim 5, wherein the explosion-proof container has, arranged therein, a second gas concentration detector which is configured to detect whether there is a leak of second gas in the explosion-proof container and a flame detector which is configured to detect whether there is an open flame in the explosion-proof container; the second gas concentration detector and the flame detector each are in linkage with the booster pump air control module and the system air control module; wherein if there is a leak of second gas or an open flame in the explosion-proof container prior to testing, an alarm alert is issued so that the auxiliary control system cannot test the sealing performance of the sealing member until the alert is released; if there is a leak of second gas or an open flame in the explosion-proof container during testing, an alarm alert is issued so that control of the booster pump air control module and the system air control module is turned off automatically to offload the test gas in the high-pressure chamber environment monitoring unit.

7. The pressure-adjustable auxiliary control system for the high-pressure gas sealing detection according to claim 1, wherein a second gas inlet of the second gas pipeline is connected to a second gas container cell, and a first gas inlet of the first gas pipeline is connected to a first gas container cell.

8. The pressure-adjustable auxiliary control system for the high-pressure gas sealing detection according to claim 1, wherein a fourth filter and a second pressure gauge are arranged in the test gas pressurization path at a position located upstream of the first booster pump processing unit, and a first parallel structure is connected;

the first parallel structure is formed by a first safety valve and an eleventh one-way valve being connected in series and then being connected in parallel with a first manual valve; the first parallel structure is connected at its one end to the first offload port and connected at its other end to the test gas pressurization path between the fourth filter and the second pressure gauge.

9. The pressure-adjustable auxiliary control system for the high-pressure gas sealing detection according to claim 1, wherein a temperature transmitter, a sixth air control valve and a third pressure gauge are arranged in the test gas pressurization path at a position located downstream of the second booster pump processing unit, and a second parallel structure is connected;

the second parallel structure is formed by a first parallel substructure being connected in parallel with a second parallel substructure, wherein the first parallel substructure is formed by a second safety valve and a twelfth one-way valve being connected in series and then being connected in parallel with a second manual valve, and the second parallel substructure is formed by a seventh air control valve and a third manual valve being connected in parallel and then being connected in series with a thirteenth one-way valve; the second parallel structure is connected at its one end to the first offload port and connected at its other end to the test gas pressurization path between the sixth air control valve and the third pressure gauge.

10. The pressure-adjustable auxiliary control system for the high-pressure gas sealing detection according to claim 9, wherein the third manual valve is located in a manual pressure relief box which is mounted outside the explosion-proof container; the offload path is connected to a flame arrestor; and a fourth pressure gauge is arranged in the test gas pressurization path at a position located between the first booster pump processing unit and the second booster pump processing unit.

11. The pressure-adjustable auxiliary control system for the high-pressure gas sealing detection according to claim 1, wherein the first filter has a filtration accuracy of ≤10 82 m, indicating that the first filter filters particles with a size equal to or smaller than 10 μm; the second filter has a filtration accuracy of ≤5 μm, indicating that the second filter filters particles with a size equal to or smaller than 5 μm; and the third filter has a filtration accuracy of ≤1 μm, indicating that the third filter filters particles with a size equal to or smaller than 1 μm.

12. The pressure-adjustable auxiliary control system for the high-pressure gas sealing detection according to claim 1, wherein a fifth filter and a seventh pressure gauge are arranged in a pipeline connected between the driving air source preprocessing unit and the booster pump air control module, and a fourth offload port is connected through a third safety valve; a fourth pressure relief valve is arranged in a pipeline connected between the booster pump air control module and the system air control module; and the fourth offload port is connected to the first offload port.

13. The pressure-adjustable auxiliary control system for the high-pressure gas sealing detection according to claim 12, where the fifth filter has a filtration accuracy of ≤0.1 μm, indicating that the fifth filter filters particles with a size equal to or smaller than 0.1 μm and the third safety valve is opened at a pressure lower than a maximum allowable pressure difference of the fifth filter.

14. The pressure-adjustable auxiliary control system for the high-pressure gas sealing detection according to claim 1, wherein the first booster pump processing unit has a pressurization ratio smaller than a pressurization ratio of the second booster pump processing unit.

* * * * *